(12) United States Patent
Oh

(10) Patent No.: US 7,165,753 B2
(45) Date of Patent: Jan. 23, 2007

(54) LOCKING DEVICE OF SEAT TRACK FOR VEHICLES

(75) Inventor: Byeong Chan Oh, Cheonan-si (KR)

(73) Assignee: Yoon Young Co., Ltd., Cheonan-Si (KR)

( * ) Notice: Subject to any disclaimer, the term of this patent is extended or adjusted under 35 U.S.C. 154(b) by 0 days.

(21) Appl. No.: 10/823,956

(22) Filed: Apr. 13, 2004

(65) Prior Publication Data
US 2004/0238712 A1 Dec. 2, 2004

(30) Foreign Application Priority Data
May 27, 2003 (KR) .................. 10-2003-0033659

(51) Int. Cl.
*F16M 13/00* (2006.01)
(52) U.S. Cl. ...................................... 248/429
(58) Field of Classification Search ........... 248/424, 248/419, 420, 423, 429; 296/64, 65.01; 297/344.11, 297/344.1, 463.1
See application file for complete search history.

(56) References Cited
U.S. PATENT DOCUMENTS 5,813,726 A * 9/1998 Husted ................. 297/378.11
5,816,110 A * 10/1998 Schuler et al. ................ 74/527
5,865,506 A    2/1999 Sakamoto et al. ..... 296/362.14
6,322,036 B1 * 11/2001 Tame et al. ................. 248/429
6,328,272 B1 * 12/2001 Hayakawa et al. ......... 248/429
6,354,553 B1 *  3/2002 Lagerweij et al. .......... 248/430
6,378,928 B1    4/2002 Downey .................. 296/65.13
6,637,712 B1 * 10/2003 Lagerweij ................... 248/429
6,764,054 B1 *  7/2004 Becker et al. .............. 248/429
2004/0222347 A1 * 11/2004 Oh ............................ 248/424

* cited by examiner

Primary Examiner—A. Joseph Wujciak, III
(74) Attorney, Agent, or Firm—Schmeiser, Olsen & Watts, LLP

(57) ABSTRACT

Disclosed herein is a locking device of a seat track for vehicles. The seat track comprises a fixed rail fastened to the bottom plane of a vehicle body and having pin holding holes, and a movable rail adapted to move along the fixed rail in a state wherein a seat is mounted thereon. The movable rail is adapted to be locked to or unlocked from the fixed rail by making use of the locking device mounted thereto. The locking device comprises operating pins laterally mounted to a side wall of the movable rail by penetrating through pin bracket fixing holes formed at the side wall.

4 Claims, 6 Drawing Sheets

LOCKING DEVICE OF SEAT TRACK FOR VEHICLES

BACKGROUND OF THE INVENTION

1. Field of the Invention

The present invention relates to a locking device of a seat track for vehicles, and more particularly to a locking device, which is embodied as a pin type locking device having a relatively high strength, thereby achieving firm locking or unlocking of a movable rail of the seat track to or from a fixed rail of the seat track.

2. Description of the Related Art

In general, seats for vehicles are configured to allow a driver and passenger sitting thereon to feel optimum ride comfort thus effectively relieving their fatigue even in case of long distance driving. Among the seats, especially, a driver-side seat and passenger-side seat disposed at the foremost line of a vehicle are installed so that the driver and passenger can move their seats back and forth on the basis of their body form.

Considering such movement of the driver-side seat, the driver should first appropriately adjust the position of the seat on the basis of his/her body shape by moving the seat back and forth before driving, so that the driver can drive a vehicle while operating a steering wheel, accelerating or braking pedal, and the like in the most comfortable sitting posture. This results in a minimization in the risk of accidents due to the unstable posture of the driver.

FIGS. 5 and 6 illustrate a locking device for use in locking or unlocking of a seat track in accordance with the prior art. As shown in FIGS. 5 and 6, the seat track of the prior art comprises a fixed rail 100 configured to be fastened to the bottom plane of a vehicle body, and a movable rail 200, which is fitted in the fixed rail 100 so as to be positioned in the upper portion of the fixed rail 100. A bracket 300 is connected to the upper surface of the movable rail 200, and the movable rail 200 moves back and forth in a state wherein a seat is mounted thereon. For locking and unlocking between the fixed rail 100 and the movable rail 200, at one side of the fixed and movable rails 100 and 200 is formed a locking member 400, which operates by an actuating lever 420. To the actuating lever 420 is coupled a towel bar bracket 510 by interposing a push nut 512 as the towel bar bracket 510, further coupled to a hinge 310 by interposing an E-ring 511, rotates about the hinge 310. The towel bar bracket 510 is connected and fixed to a towel bar 500.

The locking member 400 is formed with a plurality of downward-extending locking protrusions 410. Herein, the number of the locking protrusions 410, for example, is three. Now, considering locking operation of the locking member 400, when the towel bar bracket 510 rotates about the hinge 310 as a driver or passenger pulls up the towel bar 500 while gripping the upper end of the towel bar 500, the actuating lever 420 is raised, thus the locking protrusions 410 are released from protrusion receiving holes 110 formed at the fixed rail 100. This allows the movable rail 200 to freely move back and forth along the fixed rail 100. Therefore, the driver or passenger can appropriately adjust the position of the seat conforming to his/her body form. On the contrary, when the driver or passenger releases the towel bar 500, the locking protrusions 410 are fitted and received in the protrusion receiving holes 110 of the fixed rail 100 as the actuating lever 420 is lowered, thereby the movable rail 200 is firmly locked to the fixed rail 100.

If strong shock is transmitted from the rear side of the seat track in case of rear-end collision, however, even in a state wherein the locking protrusions 410 are received and fixed in the protrusion receiving holes 110 of the fixed rail 100, due to a stepped structure between the hinge of the locking member 400 and the receiving plane of the locking protrusions 410, undesirable turning moment is generated at the locking member 400. This causes the locking protrusions 410 to be released from the protrusion receiving holes 110, thus leading to unintentional unlocking of the movable rail 200 and the fixed rail 100. This means that the driver and passenger sitting on the seats encounter a secondary collision within the vehicle, which may induce any serious accidents.

As described above, when any shock is transmitted to a vehicle from the front or rear end in case of rear-end or head-on collision, the locking protrusions fitted in the protrusion receiving holes are unintentionally released as the seat moves back and forth due to the shock, resulting in a failure in locking between the movable rail and fixed rail of the seat track.

Further, since the fixed rail should be installed on the bottom plane of a vehicle body within a restricted narrow range, the protrusion receiving holes formed at the fixed rail inevitably have a restriction in their size and thickness, resulting in a deterioration in locking strength.

SUMMARY OF THE INVENTION

Therefore, the present invention has been made in view of the above problems, and it is an object of the present invention to provide a locking device of a seat track for vehicles, which is embodied as a pin type locking device comprising rod shaped operating pins having a relatively high strength, such a pin type locking device being achieved on the basis of the fact that holding holes for the locking device are formed at the side wall of a fixed rail of the seat track, other than the bottom wall thereof, whereby a movable rail mounted thereon with a seat can be firmly and smoothly locked to or unlocked from the fixed rail.

In accordance with the present invention, the above and other objects can be accomplished by the provision of a locking device of a seat track for vehicles, the seat track comprising a fixed rail fastened to the bottom plane of a vehicle body and having pin holding holes, and a movable rail adapted to move along the fixed rail in a state wherein a seat is mounted thereon, the movable rail being adapted to be locked to or unlocked from the fixed rail by making use of the locking device mounted thereto, the locking device comprising: operating pins laterally mounted to a side wall of the movable rail by penetrating through pin bracket fixing holes formed at the side wall, as the operating pins pass through pin penetrating holes of the movable rail and pin holding holes of the fixed rail, the movable rail being locked to or unlocked from the fixed rail, each of the operating pins has an elastic support for elastically supporting associated one of coil springs, and a tapered end provided at one side thereof for facilitating insertion of the operating pins through the pin penetrating holes of the movable rail.

Preferably, the locking device may further comprise a pin bracket having pin perforating holes for allowing the operating pins, which are elastically supported by the coil springs, to move to the left or right, hinge holes for allowing a connection hinge to be connected therethrough, and bracket mounting holes for allowing the pin bracket to be mounted to the movable rail as fixing screws are fastened therethrough; a pin actuator having pin holding portions used to fix the elastic supports of the operating pins by coming into contact with them, a lever seating portion for use in mounting of a locking lever, and hinge holes for allowing the connection hinge to penetrate therethrough; the coil springs positioned between the pin bracket and the elastic supports of the operating pins; the connection hinge used to connect the pin bracket and the pin actuator to each other by penetrating through the hinge holes of them; and the fixing screws used to mount the pin bracket to the movable rail by being fastened through the pin bracket fixing holes of the movable rail and the bracket mounting holes of the pin bracket.

Preferably, the locking lever may be mounted on the lever seating portion of the pin actuator, and may be firmly fixed by using a lever fixing member.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
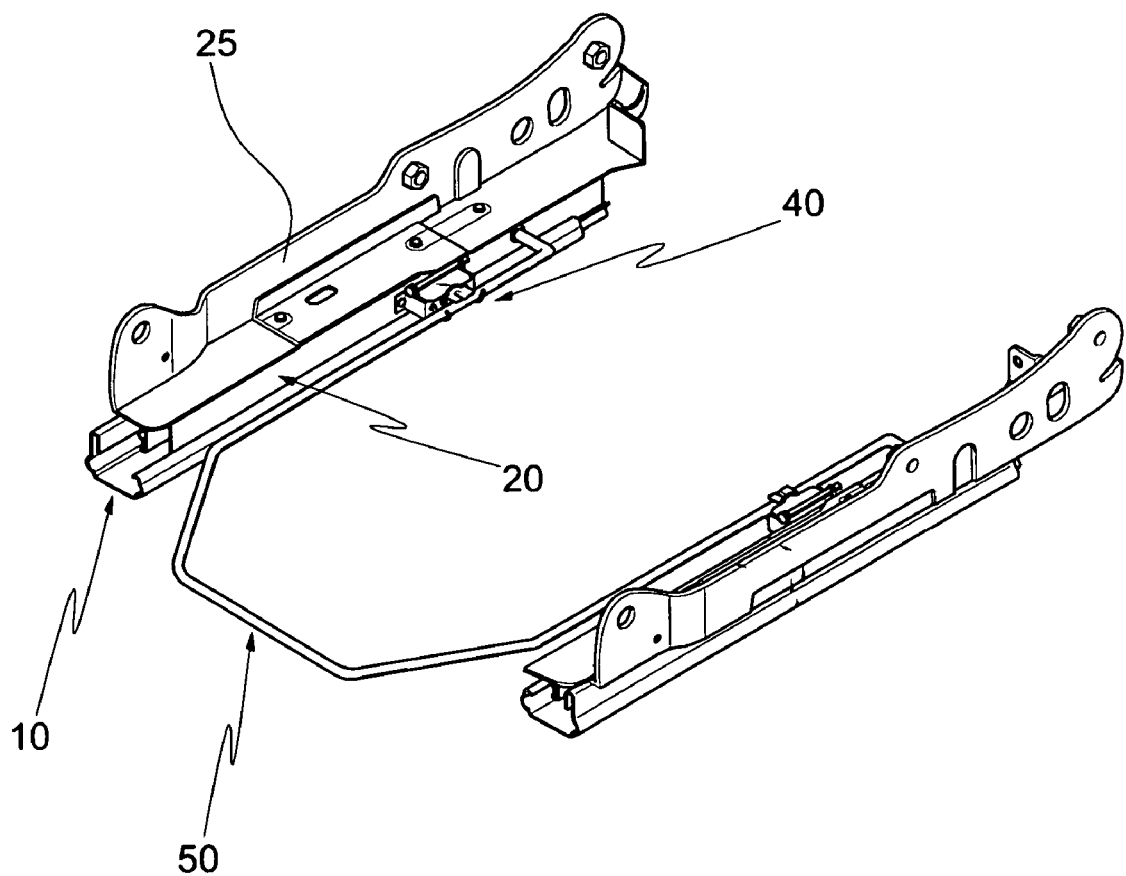
FIG. 1 is a perspective view illustrating an assembled seat track according to the present invention, to which a locking device in accordance with the present invention is applied.
Figure 2:
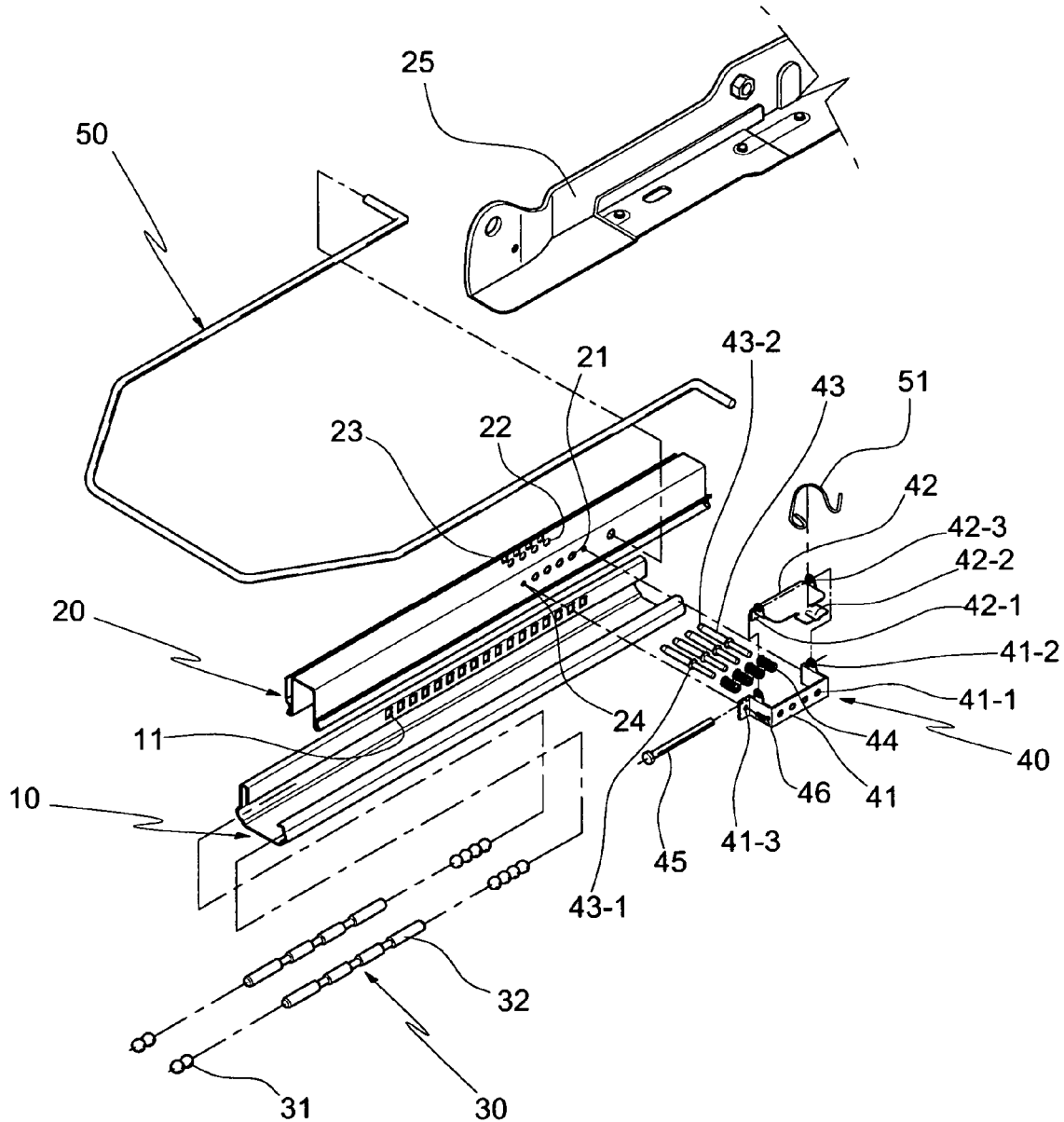
FIG. 2 is an exploded perspective view illustrating the seat track of the present invention, to which the locking device in accordance with the present invention is applied.

FIG. 1 is a perspective view illustrating an assembled seat track according to the present invention, and FIG. 2 is an exploded perspective view of the seat track, wherein a locking device in accordance with the present invention is applied. As shown in FIGS. 1 and 2, the seat track according to the present invention comprises a fixed rail 10, which is configured to be fastened to the bottom plane of a vehicle body and is formed with a plurality of pin holding holes 11, and a movable rail 20 installed so as to move inside the fixed rail 10 in a state wherein a seat is mounted thereon. The movable rail 20 is formed at both side walls thereof with a plurality of locking pin penetrating holes 21, 22 and 23, and a pair of pin bracket fixing holes 24. Between the fixed rail 10 and the movable rail 20 there are located movement guide members 30 for facilitating smooth movement of the movable rail 20 relative to the fixed rail 10. For locking or unlocking of the movable rail 20 to or from the fixed rail 10, there is provided a pin type locking device 40 comprising a plurality of operating pins 43. The operating pins 43 are configured to be laterally fastened to the side walls of the movable rail 20.

The pin type locking device 40 further comprises a pin bracket 41, a pin actuator 42, coil springs 44, a connection hinge 45, and fixing screws 46, in addition to the operating pins 43. The pin bracket 41 is formed with pin perforating holes 41-1 for allowing the operating pins 43, which are elastically supported by the coil springs 44, to move to the left or right, a pair of hinge holes 41-2 for allowing a connection hinge 45 to be connected therethrough, and a pair of bracket mounting holes 41-3 for allowing the pin bracket 41 to be mounted to the movable rail 20 as the fixing screws 46 are fastened therethrough. The pin actuator 42 has pin holding portions 42-1 used to fix elastic supports 43-1 of the operating pins 43 by coming into contact with them, a lever seating portion 42-2 for use in the mounting of a locking lever 50, and a pair of hinge holes 42-3 for allowing the connection hinge 45 to penetrate therethrough. Each of the operating pins 43 is provided with the elastic support 43-1 for elastically supporting associated one of the coil springs 44, and a tapered end 43-2 provided at one side thereof for facilitating the insertion of the operating pins 43 through the pin penetrating holes 21, 22 and 23. With this configuration as stated above, each of the coil springs 44 is positioned between the pin bracket 41 and associated one of the elastic supports 43-1, the connection hinge 45 connects the pin bracket 41 and the pin actuator 42 to each other by penetrating through the hinge holes 41-2 and 42-3, and the fixing screws 46 mount the pin bracket 41 to the movable rail 20 by being fastened through the pin bracket fixing holes 24 of the movable rail 20 and the bracket mounting holes 41-3 of the pin bracket 41.

After completion of the mounting of the locking device 40, the locking lever 50 is mounted on the lever seating portion 42-2 of the pin actuator 42, and is firmly fixed by using a lever fixing member 51.

Meanwhile, a diameter of the coil springs 44 should be smaller than that of the elastic supports 43-1 and pin penetrating holes 41-1 in order to elastically support the operating pins 43.

As stated above, as the operating pins 43 pass through the pin penetrating holes 21, 22 and 23 formed at the movable rail 20, and the pin holding holes 11 formed at the fixed rail 10 owing to the elastic force of the coil springs 44, the movable rail 20 can be firmly locked to the fixed rail 10, and thus a not shown seat, which is mounted on a seat bracket 22 of the movable rail 20, is stably fixed so as not to move.

Explaining the locking of the movable rail 20 relative to the fixed rail 10 using the locking device 40 in detail, the locking device 40 having the operating pins 43 is mounted to the movable rail 20, the pin holding holes 11 of the fixed rail 10 are formed throughout the length of the fixed rail 10, and the operating pins 43 pass through the pin penetrating holes 21, 22 and 23 of the movable rail 20 and some of the pin holding holes 11 of the fixed rail 10. In case of unlocking, as the locking lever 50 is pulled up so as to cause the pin actuator 42 to pull the operating pins 43 to the right, the operating pins 43 are released from the pin holding holes 11 of the fixed rail 10. In this state, since there is no restriction force between the fixed rail 10 and the movable rail 20, the movable rail 20, mounted thereon with a seat (not shown), can move to a desired position by means of the movement guide members 30, and the operating pins 43 are ready to pass through another set of the pin holding holes 11 of the fixed rail 10 for the locking of the movable rail 20.

Now, the operation of the locking device 40 in accordance with the present invention will be explained.

Figure 3:
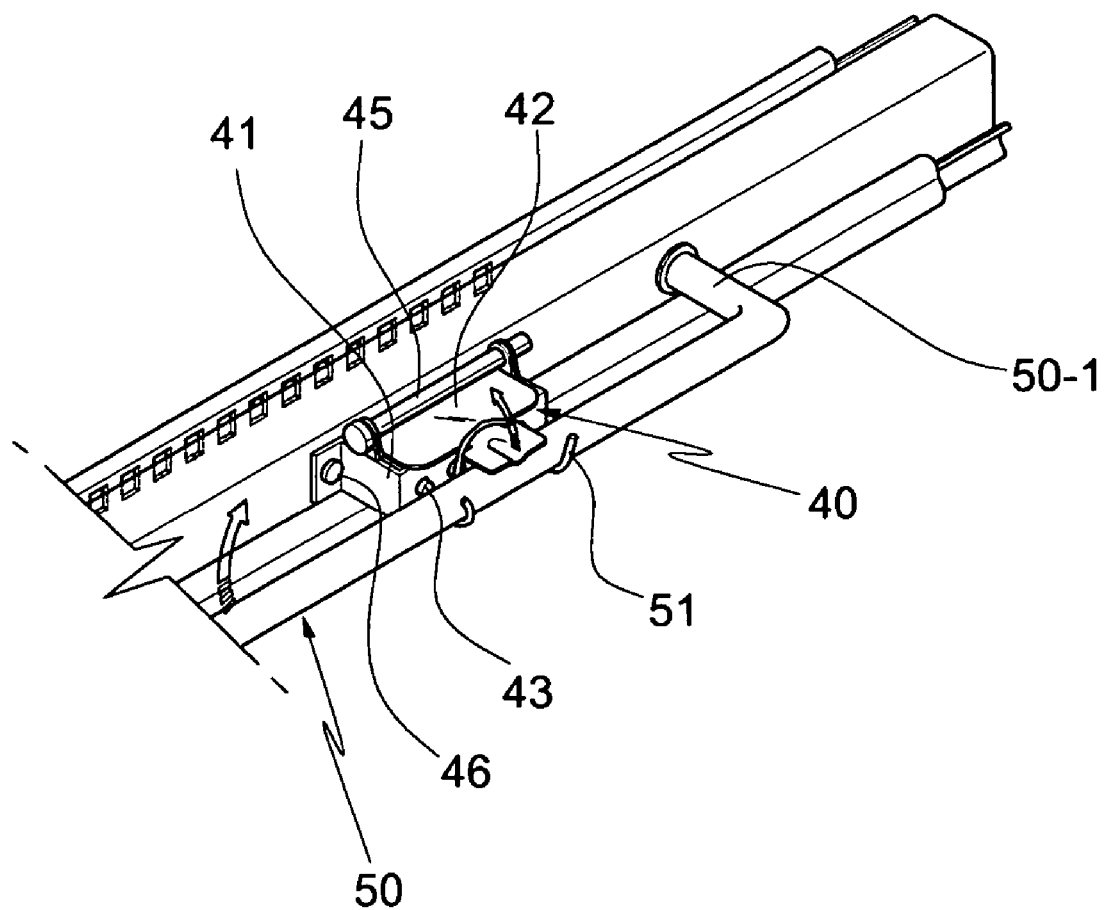
FIG. 3 is a perspective view illustrating the locking device in accordance with the present invention.
Figure 4A:
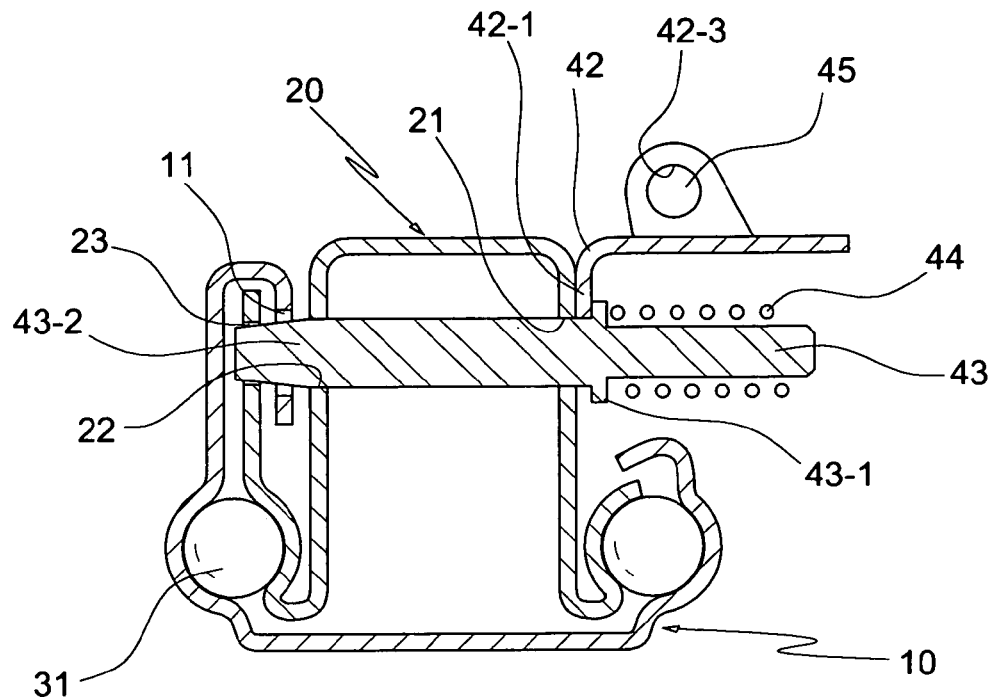
FIGS. 4a and 4b are sectional views illustrating the operation of the locking device in accordance with the present invention.
Figure 4B:
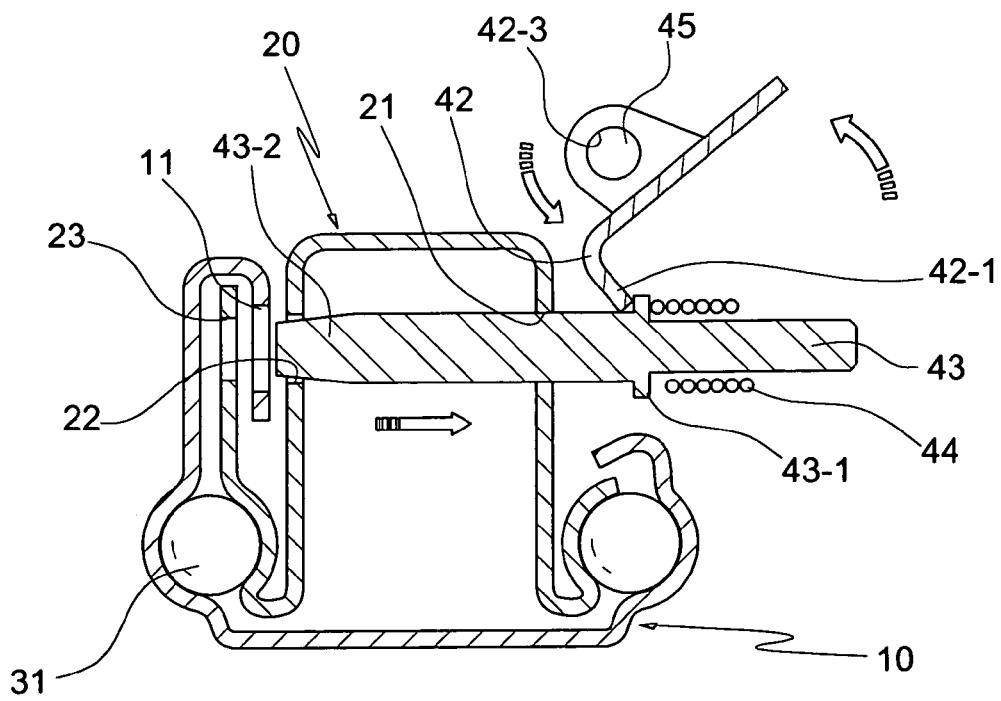
Figure 5:
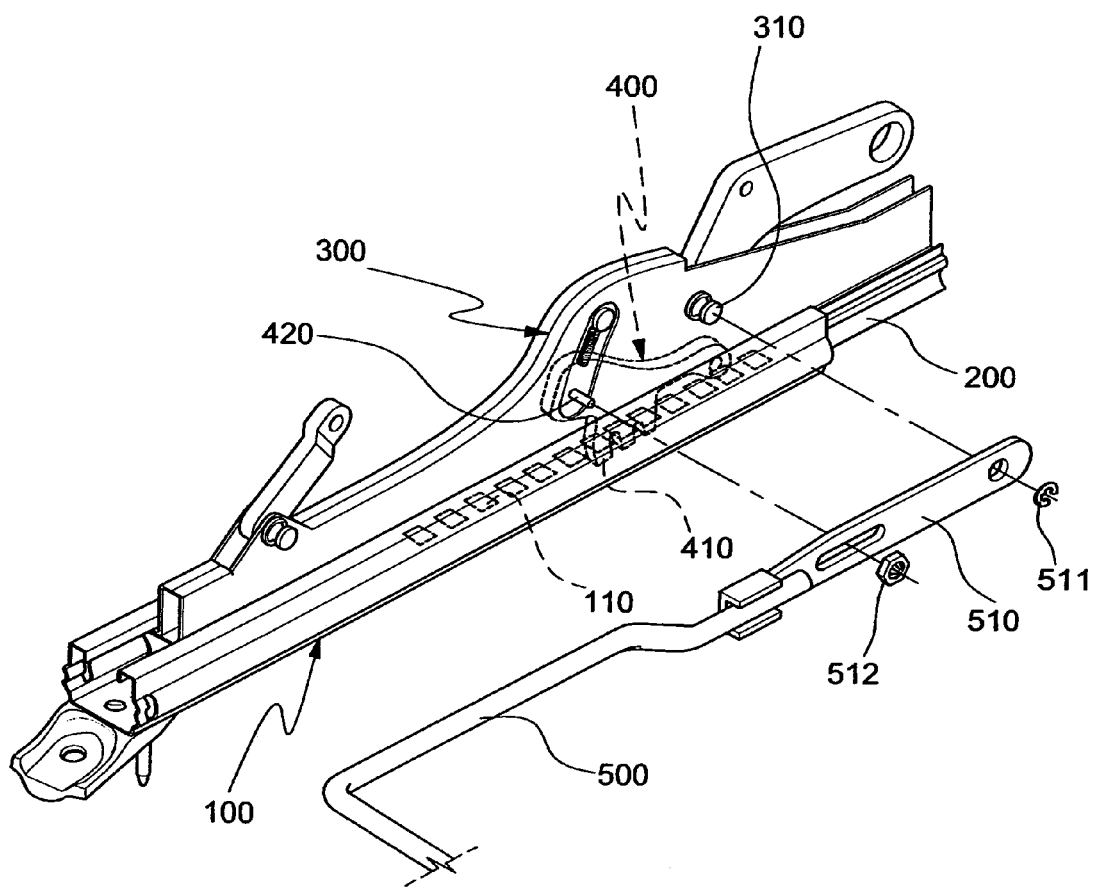
FIG. 5 is a perspective view illustrating a conventional locking device for use in a conventional seat track.
Figure 6:
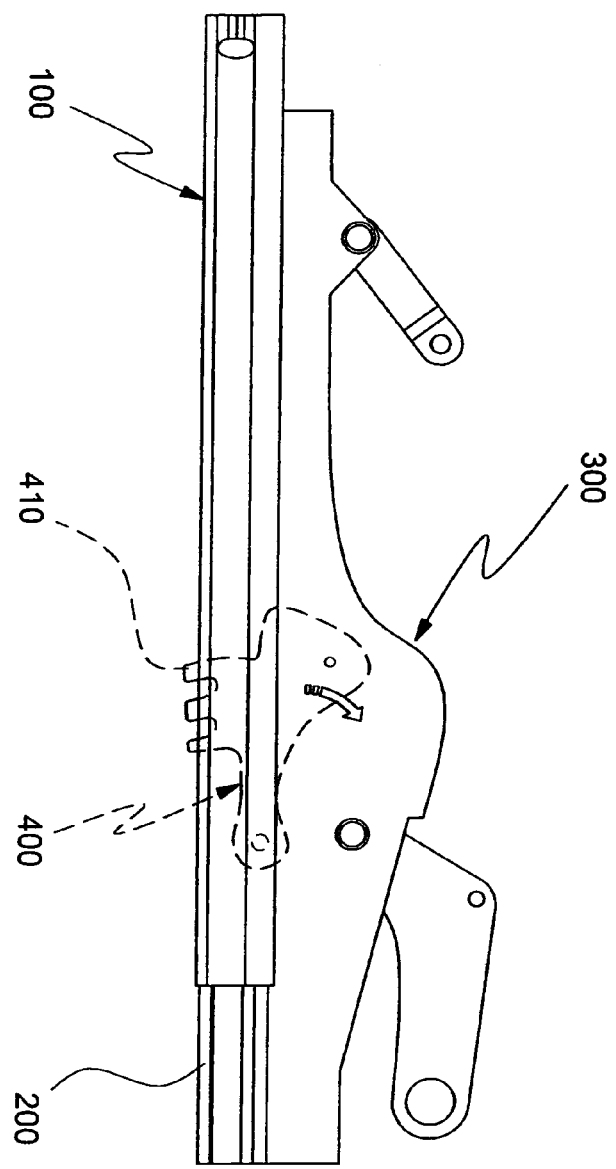
FIG. 6 is a side view of the conventional locking device shown in FIG. 5.
Figure 6:
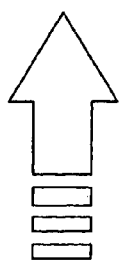

FIG. 3 is a perspective view illustrating the locking device 40 in accordance with the present invention. FIGS. 4a and 4b are sectional views illustrating the operation of the locking device 40. As shown in FIGS. 3, 4a and 4b, as a driver or passenger pulls up the locking lever 50 while gripping the upper end thereof, the locking lever 50, which is rotatably coupled to the rear end of the movable rail 20, rotates. At the same time with the rotation of the locking lever 50, the pin actuator 42, connected and fixed to the locking lever 50, rotates upward about the connection hinge 45, and the pin holding portions 42-1 rotate, thereby causing the operating pins 43 to move to the right. In this case, the coil springs 44 elastically supported by the elastic supports 43-1 are constricted, thus producing an elastic repulsive force.

In this way, as the operating pins 43 are successively released from the pin penetrating holes 23 of the movable rail 20 and the pin holding holes 11 of the fixed rail 10, the movable rail 20 is unlocked from the fixed rail 10. As a result, the movable rail 20 can freely move back and forth along the fixed rail 10, and thus a driver or passenger can move the movable rail 20 mounted with a seat (not shown) to a desired position by means of the movement guide members 30. If the driver or passenger releases the locking lever 50 at a time when the movable rail 20 reaches to the desired position, the operating pins 43 return to their original positions while moving to the left owing to the elastic force of the coil springs 44. In this case, as the operating pins 43 successively pass through the pin holding holes 11 of the fixed rail 10 and the pin penetrating holes 23 of the movable rail 20, the locking between the movable rail 20 and the fixed rail 10 is achieved.

That is, the fixed rail 10 and movable rail 20 are locked to each other by using the operating pins 43, so that the movable rail 20 does not move any more.

As apparent from the above description, the present invention provides a locking device of a seat track for vehicles which is embodied as a pin type locking device comprising rod shaped operating pins having a relatively high strength, thereby achieving firm locking or unlocking of a movable rail of the seat track to or from a fixed rail of the seat track. Such a pin type locking device is achieved on the basis of the fact that holding holes for the locking device are formed at the side wall of a fixed rail of the seat track, other than the bottom wall thereof, whereby a movable rail mounted thereon with a seat can be firmly and smoothly locked to or unlocked from the fixed rail.

Further, according to the present invention, as the pin type locking device having a relatively high strength can be installed to the movable rail of the seat track, it is possible to improve merchantability of the locking device.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A locking device of a seat track for vehicles, the seat track comprising a fixed rail fastened to the bottom plane of a vehicle body and having pin holding holes, and a movable rail adapted to move along the fixed rail in a state wherein a seat is mounted thereon, the movable rail being adapted to be locked to or unlocked from the fixed rail by making use of the locking device mounted thereto, the locking device comprising:

operating pins laterally mounted to a side wall of the movable rail by penetrating through pin bracket fixing holes formed at the side wall, as the operating pins pass through pin penetrating holes of the movable rail and pin holding holes of the fixed rail, the movable rail being locked to or unlocked from the fixed rail, each of the operating pins having an elastic support for elastically supporting associated one of coil springs, and a tapered end provided at one side thereof for facilitating insertion of the operating pins through the pin penetrating holes of the movable rail;

a pin bracket having pin perforating holes for allowing the operating pins, which are elastically supported by the coil springs, to move to the left or right, hinge holes for allowing a connection hinge to be connected therethrough, and pin bracket fixing holes for allowing the pin bracket to be mounted to the movable rail as fixing screws are fastened therethrough;

a pin actuator having pin holding portions used to fix the elastic supports of the operating pins by coming into contact with them, a lever seating portion for use in mounting of a locking lever, and hinge holes for allowing the connection hinge to penetrate therethrough;

coil springs positioned between the pin bracket and the elastic supports of the operating pins;

a connection hinge used to connect the pin bracket and the pin actuator to each other by penetrating through the hinge holes of them; and the fixing screws used to mount the pin bracket to the movable rail by being fastened through the pin bracket fixing holes of the movable rail and the bracket mounting holes of the pin bracket.

2. The device as set forth in claim 1, wherein the locking lever is mounted on the lever seating portion of the pin actuator, and is firmly fixed by using a lever fixing member.

3. A locking device of a seat track for vehicles, the seat track comprising a fixed rail fastened to the bottom plane of a vehicle body and having pin holding holes, and a movable rail adapted to move along the fixed rail in a state wherein a seat is mounted thereon, the movable rail being adapted to be locked to or unlocked from the fixed rail by making use of the locking device mounted thereto, the locking device comprising;

operating pins laterally mounted to a side wall of the movable rail by a pin bracket mounted to the side wall, as the operating pins pass through pin penetrating holes of the movable rail and pin holding holes of the fixed rail, the movable rail being locked to or unlocked from the fixed rail, each of the operating pins having an elastic support for elastically supporting associated one of coil springs, and a tapered end provided at one side thereof for facilitating insertion of the operating pins through the pin penetrating holes of the movable rail;

the pin bracket having pin perforating holes for allowing the operating pins, which are elastically supported by the coil springs, to move laterally to the left or right;

the pin bracket having hinge holes for allowing a connection hinge to be connected therethrough, and bracket mounting holes for allowing the pin bracket to be mounted to the movable rail as fixing screws are fastened therethrough;

a pin actuator having pin holding portions used to fix the elastic supports of the operating pins by coming into contact with them, a lever seating portion for use in mounting of a locking lever, and hinge holes for allowing the connection hinge to penetrate therethrough;

coil springs positioned between the pin bracket and the elastic supports of the operating pins;

a connection hinge used to connect the pin bracket and the pin actuator to each other by penetrating through the hinge holes of them; and fixing screws used to mount the pin bracket to the movable rail by being fastened through pin bracket fixing holes of the movable rail and the bracket mounting holes of the pin bracket.

4. The device as set forth in claim 3, wherein the locking lever is mounted on the lever seating portion of the pin actuator, and is firmly fixed by using a lever fixing member.

* * * * *